United States Patent

[11] 3,585,284

[72] Inventor Albert Macovski
Palo Alto, Calif.
[21] Appl. No. 774,628
[22] Filed Nov. 12, 1968
[45] Patented June 15, 1971
[73] Assignee RCA Corporation

[54] COLORED LIGHT ENCODING FILTER
25 Claims, 4 Drawing Figs.

[52] U.S. Cl. ........ 178/5.4 ST, 350/162 SF
[51] Int. Cl. ........ H04n 9/06
[50] Field of Search ........ 178/5.4 STC; 350/162 SF, 314, 316; 355/32, 33, 34

[56] References Cited

UNITED STATES PATENTS

| | | | |
|---|---|---|---|
| 2,733,291 | 1/1956 | Kell | 178/5.4 STC |
| 3,378,633 | 4/1968 | Macovski | 178/5.4 STC |
| 3,419,672 | 12/1968 | Macovski | 178/5.4 STC |

*Primary Examiner*—Robert L. Griffin
*Assistant Examiner*—Donald E. Stout
*Attorney*—Eugene M. Whitacre

ABSTRACT: Light from a subject is projected through a color filter grating structure onto a photosensitive surface of a color television camera tube. A first grating component has cyan light transmissive (red light blocking) strips, which undesirably absorb some green light, alternating with strips which absorb green light to the same extent as the cyan strips. A second grating component has yellow light transmissive (blue light blocking) strips, which undesirably absorb some green light, alternating with strips which absorb green light to the same extent as the yellow strips. The strips of the two filter gratings are so arranged relative to one another that, when employed with a color television camera, as corresponding areas of the photosensitive target electrode are scanned by an electron beam, red and blue light-representative signals are generated as amplitude modulations of carrier waves respectively having two different relatively high fundamental frequencies. The modulated carrier waves are separated by band-pass filters and the respective separated outputs are detected to develop red and blue light-representative signals. A luminance signal is derived from the camera tube through a low pass filter and is matrixed with the red and blue light-representative signals to produce luminance and color difference signals. In one arrangement, the alternating partially light absorbing strips adjacent the cyan and yellow light transmissive strips are of neutral grey material and, in another arrangement, these strips are of magenta light transmissive material.

PATENTED JUN 15 1971

3,585,284

INVENTOR
ALBERT MACOUSKI

BY Eugene M. Whitacre

ATTORNEY

COLORED LIGHT ENCODING FILTER

BACKGROUND OF THE INVENTION

Systems employing a camera tube provided with spatial color encoding filters for producing color television video signals have previously been proposed as illustrated in U.S. Pat. No. 2,733,291 granted to R. D. Kell on Jan. 31, 1956, and in U.S. Pat. No. 3,378,633 granted to A. Macovski on Apr. 16, 1968. The color filter gratings used in such systems comprise, for example, strips of color selective filter material spaced apart by strips of substantially transparent material. When light from a colored subject is projected onto the photosensitive electrode of the camera tube through the filter gratings, a color representative video signal is generated by scanning the electrode with an electron beam. The generated video signal is in the form of an amplitude modulated carrier wave, the frequency of which depends upon the number and placement of the strips of filter material and the rate at which the electron beam scans over the areas of the photosensitive electrode corresponding to the respective strips of filter material. The amplitude of the modulated carrier wave depends upon the intensity of the particular color light from the subject which is blocked by the encoding filter.

As taught in the Macovski patent, for example, the color encoding filter consists of two gratings, one of which has a first set of strips of material capable of passing substantially only cyan light (i.e., absorbing all red light) alternating with a second set of substantially transparent strips; and the other of which has a first set of strips of material capable of passing substantially only yellow light (i.e., absorbing all blue light) alternating with a second set of substantially transparent strips. The two gratings are mounted in relation to one another and to the photosensitive electrode of the camera tube such that the scansion by an electron beam of the respectively corresponding electrode areas produces one carrier wave having a first frequency and modulated in amplitude by red subject-light-representative signals and another carrier wave having a second frequency and modulated in amplitude by blue subject-light-representative signals.

There are, however, some colorimetry deficiencies of such color encoding filters in that they undesirably tend to absorb some of the light that they are designed to pass. Ideally, the cyan strips should absorb only red light and the yellow strips should absorb only blue light. The absorption by the filter strips of any light of the colors that they are intended to pass is interpreted by the system as the presence of light of the color intended to be absorbed (e.g., red or blue light). Typically, where the filter strips undesirably absorb green light, the red and blue light-representative signals are generated at amplitudes which are greater than they should be in relation to the green light-representative signals. As a result, more than the correct relative amounts of red and blue light are developed at a picture reproducer, which has the effect of desaturating green portions of the picture.

Idealized block type filters, which have relatively sharp cutoff characteristics can be used to minimize such undesired light absorption. Dichroic filters approach such an ideal in that cyan and yellow filters of this type absorb substantially only red and blue light respectively and pass with virtually no absorption light of the colors they are designed to pass. Unfortunately, however, such block type filters poorly match the color responses of the human eye.

An object of the present invention is to provide an improved spatial color encoding filter which eliminates, or significantly minimizes, the production of signals which would cause the incorrect color rendition of a reproduced color picture and, at the same time, produces signals in close approximation to color response of the human eye.

A spatial color encoding filter embodying the invention comprises at least one grating having two sets of parallel strips, preferably of equal widths, the strips of one set alternating with the strips of the other set. The strips of the first set are of a character to pass light of two of three primary colors and to effectively block by absorption light of the third primary color. The character of this first set of color selective strips is such that its color response substantially matches that of the human eye, but these strips undesirably tend to absorb light of one or both of the primary colors that they are intended to pass. This colorimetry deficiency is compensated by making the character of the second set of strips such that they absorb light of any color undesirably absorbed by the first set of strips in an amount substantially equal to that absorbed by the first set of strips. As an example, if the first set of strips is designed to pass cyan (i.e., green and blue) light, the second set of strips is designed to absorb as much green and/or blue light, as the case may be, as is undesirably absorbed by the cyan light passing strips. As another example, if the first set of strips is designed to pass yellow (i.e., green and red) light, the second set of strips is designed to absorb as much green and/or red light, as the case may be, as is undesirably absorbed by the yellow light passing strips.

In one embodiment of the invention, the second set of strips is made of material which passes neutral grey light (i.e., absorbs all colors equally and to the same extent as the color strips absorb light which they are intended to pass). The desired compensation is achieved but the grey strips also absorb some light of the color which the grating is intended to encode, viz., red for the grating having therefore cyan transmissive strips and blue for the grating having yellow transmissive strips. Such absorption reduces to some extent the percentage modulation of the resultant carrier wave which is produced by means including the color encoding filter.

In accordance with a further aspect of the invention, in the case where the first set of color selective strips provides substantially equal absorption of light of the colors intended to be passed by such first set of strips, the second set of compensating strips also is arranged to provide the same substantially equal absorption of light of the colors intended to be passed by such first set while completely passing light of the third of three selected primary colors. Specifically, where the first set of strips is cyan (green and blue), the second set is chosen as a desaturated red. Where the first set of strips is yellow (red and green), the second set is chosen as a desaturated blue. This arrangement provides full carrier modulation as well as avoiding the color desaturation problem.

More often, the first set of color selective filter strips undesirably absorbs more light of one of the colors that it is intended to pass than of the other color. The color of such excessively absorbed light generally is green which is in that portion of the visible spectrum where the absorption of both the cyan and yellow strips increases rapidly with changes in wavelength (i.e., the filter cutoff region). Consequently, in another embodiment of the invention, the second set of strips of each grating is made of desaturated magenta colored material. Such material partially absorbs green light to the same extent as green light is undesirably absorbed by the cyan and yellow strips. Furthermore, such material passes red and blue light to enable the gratings to provide maximum carrier wave modulation.

In a particular television system in which the spatial color encoding filter of the invention may be used, two gratings are provided in a mutually angular relationship such that the scansion of the corresponding areas of the photosensitive electrode of the camera tube by an electron beam produces two carrier waves of such different frequencies that they may be separately recovered by electrical band-pass filters. One of the carrier waves is modulated in amplitude by red light-representative signals derived by the beam scansion of the patterns produced on the photosensitive electrode by light derived from the subject through the grating including the cyan transmissive strips. The other carrier wave is amplitude modulated by blue light-representative signals derived by scansion of patterns produced on the electrode by subject-derived light through the grating including the yellow transmissive strips.

For a more complete disclosure of the invention, reference may be had to the following detailed description of a number of specific embodiments which is given in conjunction with the accompanying drawing, of which:

Figures 1, 2, 3, 4:
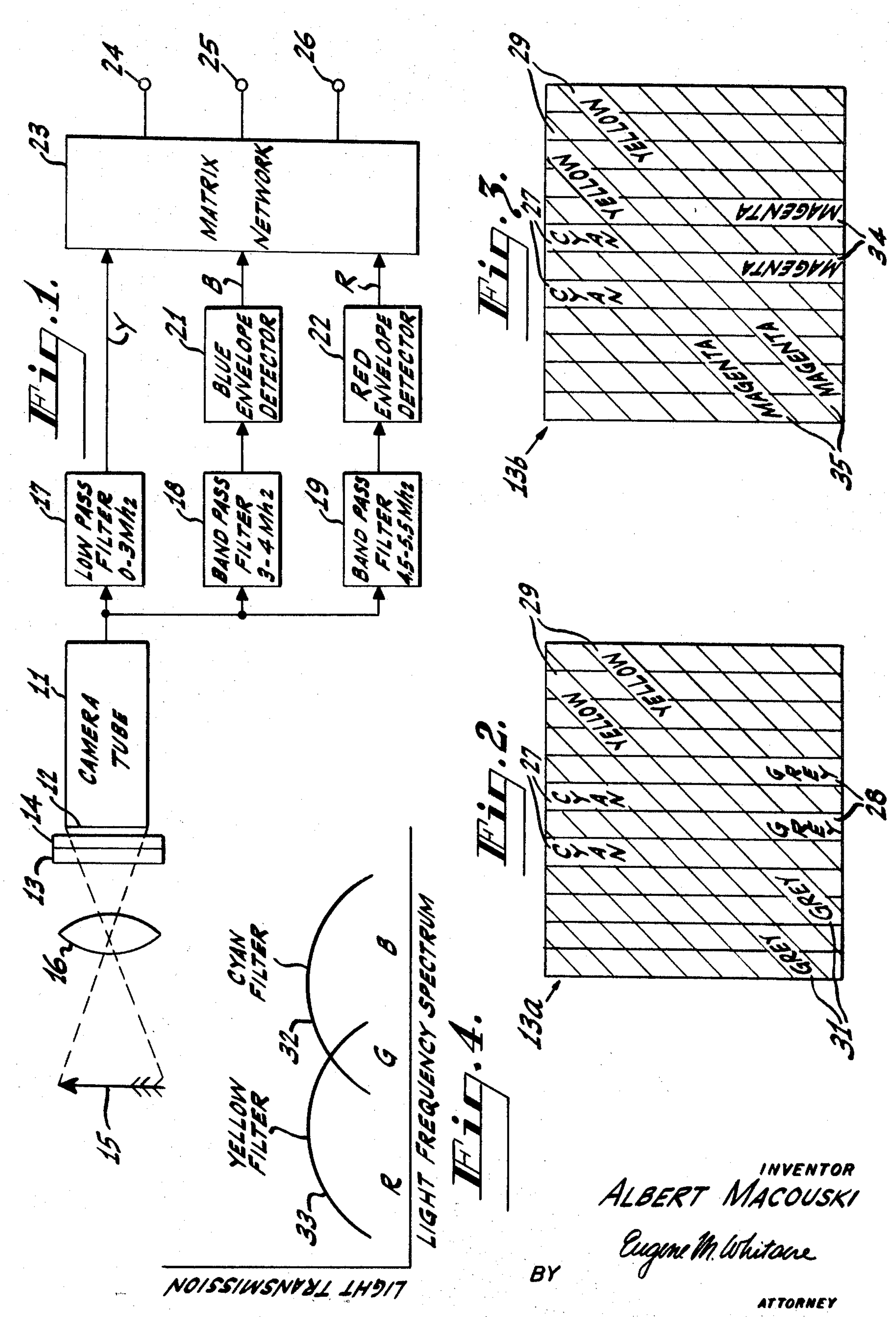
FIG. 1 is a block diagrammatic illustration of the signal generating portion of a television system in which the spatial color encoding filters of the invention may be used.
FIG. 2 is a fragmentary portion, to a grossly enlarged scale, of one form of spatial color encoding filter embodying the invention.
FIG. 3 is a fragmentary portion, to a grossly enlarged scale, of another form of a spatial color encoding filter embodying the invention.
FIG. 4 depicts typical response characteristics of cyan and yellow color selective strips used in a color encoding filter.

In FIG. 1 a color television camera includes a pickup tube 11, such as a vidicon for example, having an internally formed photosensitive electrode 12 and a color filter grating structure 13 located in the optical path between the photosensitive electrode 12 and an optical system 16 which transmits light from a colored subject 15. Color filter grating structure 13 is shown mounted externally of pickup tube 11 adjacent faceplate 14 of the tube although it may be located within the tube adjacent the photosensitive electrode 12. The grating structure 13 may be of the same general character as those disclosed in the Kell and Macovski patents previously referred to, but incorporates features of the present invention as in the structures shown in FIGS. 2 and 3 to be described subsequently. The camera tube 11 has a conventional electrode structure and other apparatus (not shown) by which to scan the photosensitive electrode 12 so that composite video signals representative of the luminance and color information of the subject 15 are derived from the tube.

The composite video signal derived from the camera tube 11 is applied to a low pass filter 17 having a frequency pass band from zero (0) to approximately 3 MHz., a first (blue) band-pass filter 18 having a frequency pass band from approximately 3 to 4 MHz., and a second (red) band-pass filter 19 having a frequency pass band from approximately 4.5 MHz. to 5.5 MHz. The output of the low pass filter 17 is the luminance, or "Y" signal, and the respective outputs of the band-pass filters 18 and 19 are carrier wave modulated in amplitude by the blue and red representative color signals respectively. The frequencies of the color carriers derived from the camera tube 11 depend upon the number of the strips in the respective gratings of the color filter grating structure 13 and the rate at which the electron scanning beam traverses the corresponding areas of the photosensitive electrode 12 of the tube 11. The filter grating structures of FIGS. 2 and 3, to be described subsequently, are so constructed and oriented relative to the direction of scanning of electrode 12 of the camera tube 11 that the blue representative carrier wave has a frequency of approximately 3.5 MHz. and the red representative carrier wave has a frequency of approximately 5 MHz. Each of the carriers has double sidebands, each sidebands being of approximately 0.5 MHz. The amplitude of the respective carrier waves depend upon the intensity of the blue and red light reaching the encoding filter 13 from the subject 15.

The respective blue and red representative carrier wave outputs from the filters 18 and 19 are demodulated by blue and red envelope detectors 21 and 22 to produce blue and red color representative signals B and R which are applied to a conventional matrix network 23 along with the luminance signal Y derived from the filter 17. The matrix network combines the Y, B and R signals in a known manner to produce luminance and color difference signals at output terminals 24, 25 and 26.

In FIG. 2 one example of a color filter grating structure **13*a* embodying the present invention has a first set of spaced vertical strips 27 of cyan (comprising blue and green) light passing material with which are alternated a second set of strips 28 of neutral grey light passing material. All of the cyan and grey strips 27 and 28 are of substantially equal widths and constitute a relatively high frequency grating because the strips 27 and 28, when mounted on camera tube 11, are at right angles to the horizontal movement of the electron beam scanning across the corresponding areas of the photosensitive electrode 12 of the camera tube 11. The filter grating structure 13*a* also has a further set of spaced strips 29 of yellow (comprising red and green) light passing material, which are disposed at about a 45° angle to the cyan and grey strips 27 and 28, and with which are alternated a still further set of strips 31 of neutral grey light passing material. All of the yellow and associated grey strips 29 and 31 are of equal width and are also of the same width as the cyan associated grey strips 27 and 28. The yellow and grey strips 29 and 31 constitute a relatively low frequency grating because of the oblique angular orientation of these strips relative to the cyan and grey strips 27 and 28. The electron beam in one line scansion does not cross as many of the areas of the electrode 12 corresponding to the filter strips 29, 31 as it does of the electrode areas corresponding to the filter strips 27, 28**.

The width and number of the strips of the filter grating structure **13*a* are such that the scansion of the corresponding areas of the camera tube electrode 12 by an electron beam at the U.S. standard line scanning rate generates, in the output of the tube, a red color carrier wave of about 5 MHz. and a blue color carrier wave of about 3.5 MHz. The equal widths of all of the strips of the filter grating structure 13*a*** and the 45° orientation of one group of strips relative to the other has the advantage of effectively eliminating objectionable beat frequencies between the two color carrier waves and, thus, avoids the creation of moire patterns in the reproduced picture. The blue carrier wave spectrum overlaps that of the red carrier wave, but the described structure of the filter gratings is such that the blue overlapping signal components occur at odd multiples of one-half of the horizontal line repetition rate so that any overlapping blue signal components are effectively cancelled by being of opposite phases on successive scansions of alternate lines of the raster in any system which has a two-to-one interlacing of an odd number of lines, such as in the U.S. standard black and white and color television systems. The interlacing of the blue signal components occurs in the same manner as the interlacing of the standard color subcarrier wave in the U.S. color television system.

In the color filter grating structure **13*a* of FIG. 2, it is preferred to use color selective materials for the cyan and yellow strips 27 and 29 respectively which have response characteristics as closely corresponding to the response characteristics of the human eye as is practical. The curves 32 and 33 of FIG. 4 represent generally the response characteristics of the cyan and yellow strips 27 and 29, respectively, of FIG. 2. As in the Macovski patent previously referred to, the functions of the cyan and yellow strips 27 and 29 are to pass all of the blue-green and red-green light respectively and to prevent by absorption the passage therethrough of red and blue light respectively. It is seen form the curves 32 and 33 of FIG. 4, however, that these strips also tend to absorb green light to a degree. Such undesired absorption of green light by the color selective filter strips is interpreted by the system as the presence of blue and red light. Consequently, the processing of the signals derived from the camera tube 11** produces blue and red signals which are greater in magnitude than is warranted by those color components of the image. When such signals are applied to an image reproducer, these incorrect blue and red signals produce more than the proper amount of blue and red light components, thereby desaturating the green light areas of the reproduced picture.

According to the present invention, such an inaccurate reproduction of a picture is prevented by making the neutral grey strips 28 and 31 of the filter grating structure **13*a* of FIG. 2 absorb green light from the subject 15 in substantially the same amount as that undesirably absorbed by the cyan and yellow strips 27 and 29. The grey strips 28 and 31 do not necessarily have identical neutral densities unless the green light absorption by the cyan and yellow strips 27 and 29 have identical green light absorption properties. It is desirable for the optimum practice of the invention that the grey strips 28 have substantially the same absorption capability for green light as the cyan strips 27, and that the grey strips 31 and the yellow strips 29** have substantially equal green light absorption properties.

The neutral grey strips 28 and 31 of FIG. 2, not only absorb the desired amount of green light to match the undesired green light absorption of their respectively associated cyan and yellow strips 27 and 29, but also absorb some blue and red light which undesirably reduces to some extent the amplitude modulation of the blue and red carrier waves. A modified form of a color encoding filter **13*b* constructed in accordance with another aspect of the invention shown in FIG. 3 accomplishes the desired green light absorption compensation without reducing the blue and red carrier wave modulation. In this embodiment, the cyan and yellow strips 27 and 29 are interspersed with desaturated magenta strips 34 and 35 respectively (i.e., the color complementary to green). These magenta strips have the property of passing blue and red light and of partially blocking by absorption the passage of green light. The magenta strips 34 and 35 have such densities as to (1) absorb the proper amount of green light to match the green light absorption of their associated cyan and yellow strips 27 and 29 and (2) pass substantially all of the blue and red light from the subject 15**, thereby preventing green light desaturation and also enabling the full modulation of the blue and red carrier waves.

It is to be especially noted that the present invention is directed, not to the broad idea of interspersing the color selective strips of one or more color filter gratings with strips of neutral grey or color tinted materials as suggested in such prior art as represented by U.S. Pat. No. 2,748,189 granted to L. H. Bedford on May 29, 1956, but instead to the specific arrangement in which the neutral grey and/or colored material of the interspersed strips has the property of absorbing substantially the same amount of particular color light from a subject as that undesirably absorbed by color selective strips having substantially the same gently sloping characteristics as those of the human eye.

The color carrier frequencies generated by the filter structure of the present invention are kept relatively low so as to be well within the resolution capabilities of the camera tube and the neutral grey and/or the desaturated magenta strips play no part in eliminating, from the reproduced picture, moire patterns produced by beat frequencies between the two color carriers as in the Bedford patent. Any such reproduced picture distortion, as well as others which may be caused by previously discussed signal interference, are obviated by making all of the strips of the present filter grating structure of equal widths and by angularly orienting one filter grating relative to the other as described above. The neutral grey and/or the magenta strips of the present structure, having the specified green light absorption properties, serve primarily to correct the described colorimetry deficiencies of the particular color selective strip materials preferred for use in the structure.

It is to be understood, as within the purview of the present invention, that the relative orientation of the cyan and yellow filters may be reversed, in which case the red signals will modulate the lower frequency carrier wave at 3.5 MHz. and the blue signals will modulate the higher frequency carrier wave at 5 MHz.

Also, while the invention is shown and described in a television system environment for encoding a luminance and two color representative signals, it is to be understood that it is equally applicable to any system for spatially separating subject derived light into its several component colors. Such a system may relate to photographic reproduction of images in the manner described in one embodiment in the Macovski patent previously referred to. In such a photographic system, the encoding filter pattern is imaged by light from a scene onto a film plane instead of onto the photosensitive element of a television camera pickup tube. The colorimetry correction provided by this invention corrects errors in the film-recorded images similarly to the colorimetry error correction of images appearing on the photosensitive element of a television camera pickup tube.

What I claim is:

1. A spatial color encoding filter for separating image-representative light into color components for forming a monochromatic image thereof which upon being scanned yields a color-representative carrier wave component, comprising:

first and second sets of parallel strips, the strips of said first set alternating with the strips of said second set;

said first set of strips having a transmission characteristic so as to pass light of selected color components and to effectively block by absorption light of another color component, but undesirably absorbing a portion of said light of selected color components; and said second set of strips having a transmission characteristic so as to pass selected color components of different spectral ranges than those passed by said first set of strips but at the same time passing substantially the same portion of the undesirably absorbed component which is passed by said first set of strips and to absorb light of the same color as that undesirably absorbed by said first set of strips and in an amount substantially equal to that absorbed by said first set of strips.

2. A spatial color encoding filter as defined in claim 1, wherein:

said selected color components constitute first and second primary colors, and said other color component constitutes a third primary color.

3. A spatial color encoding filter as defined in claim 2, wherein:

said second set of strips is of a material to pass neutral grey subject-derived light.

4. A spatial color encoding filter as defined in claim 2, wherein:

said first set of strips undesirably absorbs more light of said first primary color component than light of said second primary color component; and said second set of strips is of a material to pass subject derived light of a color component complementary to said first primary color component.

5. A spatial color encoding filter as defined in claim 4, wherein:

said first, second and third primary color components are green, blue and red, respectively; and said complementary color component is magenta.

6. A spatial color encoding filter as defined in claim 4, wherein:

said first, second and third primary color components are green, red and blue respectively; and said complementary color component is magenta.

7. A spatial color encoding filter for separating image-representative light into primary color components for forming a monochromatic image thereof which upon being scanned yields color-representative carrier wave components comprising:

first and second gratings, each having first and second sets of substantially parallel strips, the strips of a first set alternating with strips of a second set, the strips of said first and second grating being so arranged relative to one another that, when image-representative light passes therethrough, such light is separated into color components;

said first set of strips of said first grating having a transmission characteristic so as to pass light of first color components from a subject and to block light of color components other than said first components, but undesirably absorbing a portion of said light of said first color components;

said first set of strips of said second grating having a transmission characteristic so as to pass light of said second color components;

said second set of strips of said first and second gratings respectively having transmission characteristics so as to pass selected color components of different spectral ranges than those passed by said first set of strips of said first and second gratings, respectively, but at the same time passing substantially the same portion of the undesirably absorbed component which is passed by said first set of strips of said first and second gratings, respectively, and to absorb light of said first and second color components, respectively, in amounts substantially equal to the amounts thereof undesirably absorbed by corresponding strips of said first set of strips of said first and second gratings.

8. A spatial color encoding filter as defined in claim 7, wherein said first color components comprise first and second primary colors and said second color components comprise second and third primary colors.

9. A spatial color encoding filter as defined in claim 8, wherein said first, second and third primary colors are blue, green and red, respectively.

10. A spatial color encoding filter as defined in claim 9, wherein said second set of strips is of a material to pass neutral grey light.

11. A spatial color encoding filter as defined in claim 9, wherein said second set of strips is of a material to pass magenta light.

12. In a color television system, a spatial color encoding filter through which to project colored light from a subject onto a camera tube, comprising:

a grating having first and second sets of parallel strips, the strips of said first set alternating with the strips of said second set;

said first set of strips having a transmission characteristic so as to pass light of first and second primary colors from said subject and to effectively block light of a third primary subject color, but undesirably absorbing some light of said first primary color; and said second set of strips having a transmission characteristic so as to pass selected color components of different spectral ranges than those passed by said first set of strips but at the same time passing substantially the same portion of the undesirably absorbed component which is passed by said first set of strips and to absorb light of said first primary color from said subject in an amount substantially equal to that absorbed by said first set of strips.

13. A spatial color encoding filter as defined in claim 12, wherein:

said first primary subject color light is green; and said second primary subject color light is blue.

14. A spatial color encoding filter as defined in claim 13, wherein:

said first set of strips is of a material to pass cyan light from said subject; and said second set of strips is of a material to pass neutral grey subject light.

15. A spatial color encoding filter as defined in claim 13, wherein:

said first set of strips is of a material to pass cyan light from said subject; and said second set of strips is of a material to pass magenta subject light.

16. A spatial color encoding filter as defined in claim 12, wherein:

said first primary subject color light is green; and said second primary subject color light is red.

17. A spatial color encoding filter as defined in claim 16, wherein:

said first set of strips is of a material to pass yellow light from said subject; and said second set of strips is of a material to pass neutral grey subject light.

18. A spatial color encoding filter as defined in claim 16, wherein:

said first set of strips is of a material to pass magenta subject light.

19. In a color television system, a spatial color encoding filter through which to project light of first, second and third primary colors from a subject onto the photosensitive electrode of a camera tube to be scanned by an electron beam, comprising:

a low frequency and a high frequency grating, each having first and second sets of substantially equal width parallel strips, the strips of said first set alternating with the strips of said second set;

the strips of said low and high frequency gratings being so arranged relative to one another that, when the corresponding areas of the photosensitive electrode of the camera tube are scanned by said electron beam, two color representative signals are generated as amplitude modulations of two carrier waves respectively having low and high frequencies relative to one another;

the first set of strips of said low frequency grating having a transmission characteristic so as to pass light from said subject of said first and second primary colors and to effectively block subject light of said third primary color, but undesirably absorbing some light of said first primary color;

the first set of strips of said high frequency grating having a transmission characteristic so as to pass light from said subject of said first and third primary colors and to effectively block subject light of said second primary color, but undesirably absorbing some light of said first primary color; and the second set of said low and high frequency gratings having a transmission characteristic so as to pass selected color components of different spectral ranges than those passed by said first set of strips of said high and low frequency gratings, respectively, but at the same time passing substantially the same portion of the undesirably absorbed component which is passed by said first set of strips of said high and low frequency gratings, respectively, and to absorb light of said first primary color from said subject in an amount substantially equal to that undesirably absorbed by the respectively associated first set of strips of each of said low and high frequency gratings.

20. A spatial color encoding filter as defined in claim 19, wherein:

said first, second and third primary subject colors are green, blue and red respectively;

the first set of strips of one of said gratings being of a material to pass cyan (comprising said green and blue) light from said subject and to effectively block said red subject light;

the first set of strips of the other of said gratings being of a material to pass yellow (comprising said green and red) light from said subject and to effectively block said blue subject light; and the second set of strips of each of said gratings being of a material to pass neutral grey subject light.

21. A spatial color encoding filter as defined in claim 20, wherein:

said cyan and yellow light passing materials have gently sloping characteristics which substantially match the responses of the human eye to such colors.

22. A spatial color encoding filter as defined in claim 21, wherein:

said high frequency grating including said cyan passing strips is mounted so that corresponding areas of said photosensitive camera tube electrode are substantially at right angles to the scanning lines of said electron beam, whereby the generated carrier wave modulated by said red subject light representative signals is of a relatively high frequency; and said low frequency grating including said yellow light passing strips is mounted so that the corresponding areas of said photosensitive camera tube electrode are at an oblique angle to the scanning lines of said electron beam, whereby the generated carrier wave modulated by said blue subject light representative signals is of a relatively low frequency.

23. A spatial color encoding filter as defined in claim 19, wherein:

said first, second and third primary subject colors are green, blue and red respectively;

the first set of strips of one of said gratings being of a material to pass cyan (comprising said green and blue) light from said subject and to effectively block said red subject light;

the first set of strips of the other of said gratings being of a material to pass yellow (comprising said green and red) light from said subject and to effectively block said blue subject light; and the second set of strips of each of said grating being of a material to pass magenta (comprising said red and blue) light from said subject.

24. A spatial color encoding filer as defined in claim 23, wherein:

said cyan and yellow light passing material have gently sloping characteristics to substantially match the responses of the human eye to such colors; and said magenta light passing material, in addition to absorbing the desired amount of said green subject light, also fully passes said red and blue subject light so as to enhance the amplitude modulation of the respective carrier waves by said red and blue subject light representative signals.

25. A spatial color encoding filter as defined in claim 24, wherein:

said high frequency grating including said cyan light passing strips is mounted so that the corresponding areas of said photosensitive camera tube electrode are substantially at right angles to the scanning lines of said electron beam, whereby the generated carrier wave modulated by said red subject light representative signals is of a relatively high frequency; and said low frequency grating including said yellow light passing strips is mounted so that the corresponding areas of the photosensitive camera tube electrode are at an oblique angle to the scanning lines of said electron beam, whereby the generated carrier wave modulated by said blue subject light representative signals is of a relatively low frequency.

UNITED STATES PATENT OFFICE
CERTIFICATE OF CORRECTION

Patent No. 3,585,284 Dated June 15, 1971

Inventor(s) Albert Macovski

It is certified that error appears in the above-identified patent and that said Letters Patent are hereby corrected as shown below:

Column 4, line 55, that portion reading "form" should read -- from --.
Column 8, line 33, after "set" insert -- of strips --.
Column 9, line 21, that portion reading "filer" should read -- filter --.

Signed and sealed this 21st day of March 1972.

(SEAL)
Attest:

EDWARD M.FLETCHER,JR.
Attesting Officer

ROBERT GOTTSCHALK
Commissioner of Patents